W. R. WALKER.
CULINARY BASKET.
APPLICATION FILED FEB. 7, 1915.
1,285,490.
Patented Nov. 19, 1918.
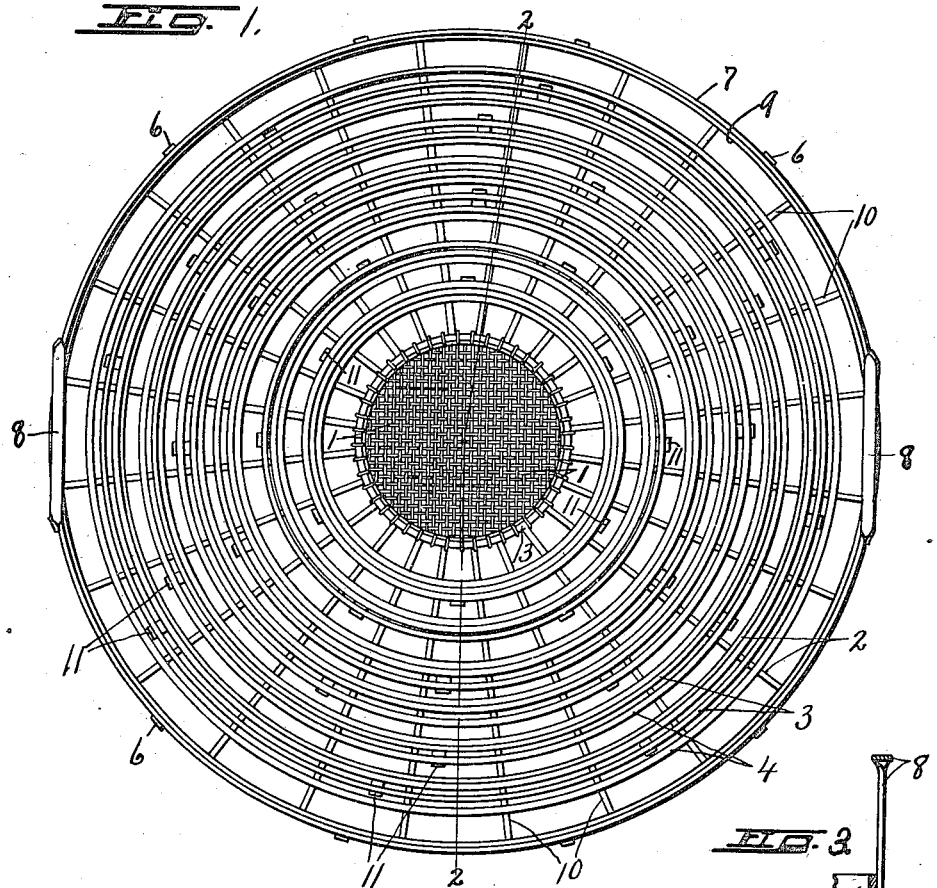
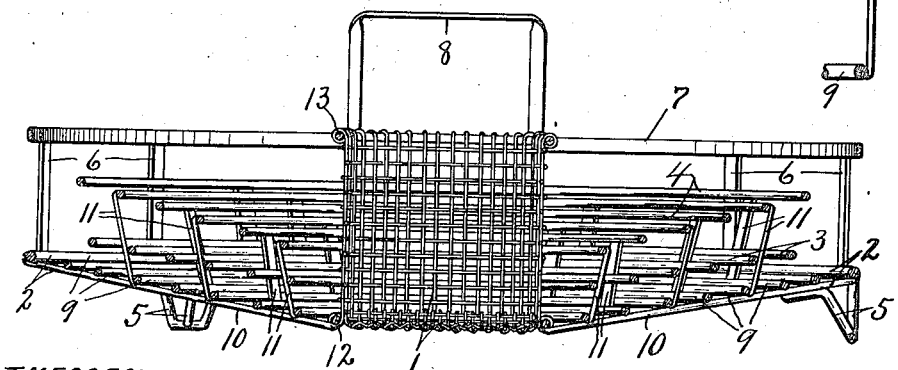
WITNESSES:
INVENTOR
W. R. Walker
BY Howard P. Denison
ATTORNEY.

UNITED STATES PATENT OFFICE.

WILLARD R. WALKER, OF SYRACUSE, NEW YORK, ASSIGNOR TO WALKER BROTHERS COMPANY, OF SYRACUSE, NEW YORK, A CORPORATION OF NEW YORK.

CULINARY BASKET.

1,285,490.   Specification of Letters Patent.   Patented Nov. 19, 1918.

Application filed February 1, 1915. Serial No. 5,492,

*To all whom it may concern:*

Be it known that I, WILLARD R. WALKER, a citizen of the United States, and resident of Syracuse, in the county of Onondaga, in the State of New York, have invented new and useful Improvements in Culinary Baskets, of which the following, taken in connection with the accompanying drawings, is a full, clear, and exact description.

This invention relates to certain improvements in culinary baskets for handling and conveying dishes and other kitchen and dining room utensils *en masse* from place to place and also for permitting those utensils to be washed and dried without removing them from the basket and is adapted to be used more particularly in dish washing machines of the class set forth in my pending applications, Serial Nos. 776,678, filed June 30, 1913; 811,720, filed January 12, 1914, and 847,965, filed June 29, 1914.

Aside from the main purpose just previously stated, another object is to render the basket light, strong and durable and capable of receiving and retaining a maximum number of dishes and other utensils within a comparatively small and compact space, and at the same time to reduce the liability of breakage, chipping or cracking the most delicate quality of crockery or glass ware which may be temporarily supported therein.

Another object is to construct the basket in such manner so that when the dishes and other utensils are placed therein practically all surfaces thereof will be exposed to the cleansing influence of currents of water which may be passed entirely through the basket from any angle or point of approach.

Other objects relating to specific parts of the basket will be brought out in the following description.

In the drawings—

Figure 1 is a top plan and Fig. 2 a transverse vertical sectional view of my improved basket.

Fig. 3 is a detail vertical sectional view through one side of the basket showing the manner of attaching the handles.

As illustrated, this basket is circular in top plan and comprises a central circular cage —1— of open work and lower, intermediate and upper sloping decks —2—, —3— and —4— in spaced relation one above the other and surrounding the central cage —1—, the lower deck being provided near its marginal edge with a series of, in this instance three, legs or feet —5— spaced uniform distances apart circumferentially with their lower ends in approximately the same horizontal plane as the bottom of the central portion of the lower deck and also with the bottom of the cage —1— so that the basket may have a central supporting point in addition to the three supporting points of the legs when placed upon a level surface.

The lower deck or main bottom —2— of the basket is also provided at or near its marginal edge with an upright open-work flange consisting of a series of upright posts —6— rising approximately to the same height as the cage —1— and spaced uniform distances apart circumferentially for supporting at their upper end a circular guard rail —7— of substantially the same diameter as the outer diameter of the lower deck or bottom of the basket, said guard rail serving the double purpose of stiffening the basket and also of supporting plates and similar dishes which may rest on the underlying portion of the lower deck or bottom —2—.

In addition to the posts or stays —6— the guard rail —7— is supported by the arms of diametrically opposite handles —8—, said handles being extended some distance above the guard rail —7— for convenience in handling and carrying the basket with the dishes and other utensils therein.

The posts —6— and arms of the handles —8— are rigidly and permanently secured preferably by electric welding or brazing to the outer face of the outer marginal ring of the lower deck —2— and to the face of the guard rail —7— so as to produce substantially smooth firm joints without extra fastening means.

The central cage —1— is of relatively small diameter as compared with the outer diameter of the basket and serves to receive knives, forks, spoons and similar utensils and is of sufficiently fine mesh to prevent said utensils from falling therethrough, and at the same time the mesh is coarse enough to allow the cleansing fluid to be projected through the meshes from any angle for cleansing the articles therein.

The lower deck or bottom —2— of the basket is composed of a series of circular concentric rings or wires —9— arranged preferably in uniform spaced relation radially and rigidly connected to each other by radial tie pieces —10— which are also spaced uniform distances apart circumferentially and are electrically welded or otherwise firmly secured to the rings to form smooth and secure joints, the outer ring being of somewhat larger gage wire than the inner rings to increase the rigidity of the basket, although it is evident that all of the other rings secured in the manner described to the radial tie-pieces —10— perform a similar bracing function.

In like manner each deck —3— and —4— is composed of a series of circular concentric rings arranged in spaced relation around the cage —1— and are held in fixed relation to each other and to the bottom or lower deck —2— by upright stays —11—.

All of the decks slope or incline upwardly from the center outwardly, the upper deck being inclined at a greater angle than the lower decks so as to bring the outer ring of the upper deck a greater distance from the bottom than the inner ring of the same deck.

The intermediate and upper decks have the same number of rings —3— and —4— arranged in substantially the same spaced relation as those of the lower deck or bottom of the basket, the rings of the intermediate deck being of slightly greater diameter than the corresponding rings of the lower deck while the rings of the upper deck are of correspondingly greater diameter than the corresponding rings of the intermediate deck, thus forming separate sets of rings in which those of each set are arranged one above the other in spaced relation corresponding to the spacings between the decks and together with the supporting stays —11— constitute a series of circular concentric partitions flaring upwardly from the bottom or lower deck.

The stays —11— of each partition are spaced uniform distances apart circumferentially and secured by electric welding or equivalent fastening means to the outer faces of their corresponding rings and are, therefore, substantially straight, leaving the intervening spaces or channels between the several partitions continuous or unobstructed throughout their entire lengths so that a dish or similar utensil may be rolled along the bottom entirely around any one of the channels without obstruction, and permitting plates and similar dishes to be placed in said channels at any point and in overlapping relation.

It will be noted that the tie-pieces —10— are secured to the under sides of the concentric bottom rings —9— and that the stays —11— are secured to the outer faces of the corresponding rings of the lower, intermediate and upper decks, while the stays —6— are secured to the outer faces of the marginal ring —2— and superposed guard ring —7—, thus leaving the inner faces of all of said rings against which the dishes rest smooth and unobstructed throughout their entire lengths to reduce the liability of chipping or breaking of the dishes as they are moved along and against the inner faces of said rings.

This allows a large number of utensils to be placed in the basket and to be carried from place to place, as for example from the dining room to the kitchen and vice versa, and also permits those utensils to be thoroughly cleansed and dried by the application of currents of water or other cleansing fluid into and through the basket and across the surface of the utensils therein without removing such utensils from the basket, it being understood that after the dishes are thoroughly washed they may be left in the basket to drain and dry and afterward carried to the place of distribution in the same basket.

The lower and upper ends of the cage —1— are reinforced by wire rings —12— and —13— which are of somewhat heavier gage than the wires which form the mesh, the wire ring —12— being securely fastened to the inner ends of the tie pieces —10— of the lower deck or bottom of the basket.

These tie pieces —10— are arranged in sufficiently close relation to prevent plates and similar dishes from falling between them, and at the same time leaving sufficient opening to allow currents of water to be projected therethrough from the bottom or top.

It is evident from the foregoing description that the entire basket is practically rigid, yet light, strong and durable and capable of supporting any number of articles which may be assembled therein without liability of overstraining or breaking any of the parts.

Furthermore, the smooth connection produced by the electric welding of the various connections and the absence of any obstructions in the annular channels between the partitions reduces to a minimum the liability of breakage or chipping of china, glass or other crockery which may be placed therein, while the general structure of the basket enables large quantities of dishes to be carried from place to place and washed, cleansed and dried and returned for distribution in the same basket without removal, thereby further reducing the liability of breakage.

What I claim is:

In a culinary basket, the combination of a central open-work cage of relatively fine mesh, an open-work deck of relatively coarse mesh inclining upwardly and outwardly from the bottom of the cage and provided near its outer marginal edge with supporting legs having their lower ends disposed in approximately the same horizontal plane as the bottom of the cage for supporting the basket at both the center and margin, an upright open-work flange rising from the marginal edge of said deck to approximately the height of the cage, and a series of upwardly flaring partitions rising from the deck in spaced relation between the cage and outer marginal flange.

In witness whereof I have hereunto set my hand this 27th day of January, 1915.

WILLARD R. WALKER.

Witnesses:
 H. E. CHASE,
 ALICE M. CANNON.